United States Patent [19]

Janssen et al.

[11] 4,195,874
[45] Apr. 1, 1980

[54] VEHICLE REAR WINDOW ARRANGEMENT

[75] Inventors: Lutz Janssen, Wolfsburg; Klaus-Rainer Deutenbach, Gifhorn-Kästorf; Hans-Jochen Lückoff, Wolfsburg; Karl Warnecke, Ehmen, all of Fed. Rep. of Germany

[73] Assignee: Volkswagenwerk Aktiengesellschaft, Wolfsburg, Fed. Rep. of Germany

[21] Appl. No.: 926,855

[22] Filed: Jul. 21, 1978

[30] Foreign Application Priority Data

Aug. 20, 1977 [DE] Fed. Rep. of Germany ....... 2737638

[51] Int. Cl.² .............................................. B60J 1/20
[52] U.S. Cl. ...................................... 296/1 S; 296/91
[58] Field of Search ...................... 296/1 S, 91, 84 R

[56] References Cited

U.S. PATENT DOCUMENTS 3,427,067  2/1969  Kish ...................................... 296/1 S

FOREIGN PATENT DOCUMENTS 2340308  9/1973  Fed. Rep. of Germany ........... 296/1 S
2555006  6/1975  Fed. Rep. of Germany ........... 296/1 S
2649953  10/1976 Fed. Rep. of Germany ........... 296/1 S Primary Examiner—Philip Goodman
Attorney, Agent, or Firm—Brumbaugh, Graves, Donohue & Raymond

[57] ABSTRACT

A vehicle is provided with a rear window arrangement having first and second rear window portions at different angles from the vertical, and a spoiler with an upper deflection surface having an angle of at least 90° from the vertical. The two portion rear window arrangement provides increased rearward visibility and decreased vehicle wind resistance. The spoiler may be arranged to form a flow channel around the edge where the two window portions meet, to deflect an air stream and prevent accumulation of dirt on the lower rear window portion.

6 Claims, 3 Drawing Figures

VEHICLE REAR WINDOW ARRANGEMENT

BACKGROUND OF THE INVENTION

This invention relates to the rear window arrangement for a motor vehicle and particularly to fastback rear window arrangements wherein a slanted rear window is provided to improve vehicle aerodynamics.

FIG. 1 generally illustrates the various rear window configurations for a motor vehicle and the variation of the drag coefficient $C_W$ and lift coefficient $C_{AH}$, measured at the rear axle, as a function of the angle a between the rear window surface and the vertical. The angle a is illustrated in the drawings of the rear portions of motor vehicles at the top of FIG. 1. These drawings illustrate a square back vehicle, on the left, having a small angle a and a fastback vehicle, on the right, having a large angle a. For a vehicle with an angle a equal to 30°, wind induced drag and lift coefficients at the rear axle of the vehicle are proportional to vehicle speed, and the coefficients have values indicated in the FIG. 1 graph. As the angle of the rear window increases, there is little substantial change in the drag or lift coefficients for angles less than approximately 50°. For these angles, the flow of air along the vehicle roof becomes non-laminar at the rear roof edge and creates a dead air space T2.

At angles above 50° for the rear window, the air flow remains laminar along the vehicle roof edge and over the rear window surface, but becomes non-laminar at the rear edge of the window and creates a dead air space T1. Drag and lift coefficients increase sharply at around 60°, because of the formation of high energy marginal vortices. A smooth laminar flow takes place along the rear window surface itself, so that the vehicle behaves as a true fastback.

One particular advantage of the fastback configuration is the existence of a smooth air flow over the rear window and elimination of the dead air space T2 behind the window. The elimination of the dead air space T2 adjacent the rear window surface helps prevent accumulation of dirt on the rear window.

From the graph in FIG. 1, it can be seen that an increase in the angle a beyond 60° will decrease both the drag and lift coefficient. As the rear window angle from vertical increases, however, the edge at which it meets the rear end of the vehicle moves higher, resulting in an impairment of the driver's rearward visibility.

In order to provide both a highly inclined rear window surface and improved rearward visibility, it is known to provide two rear window portions, the first at a highly slanted configuration, and forming the fastback portion of the vehicle, and the second having an angle near vertical and forming a portion of the rear of the vehicle in the region of the dead air space.

It is an object of the present invention to provide a vehicle having an improved fastback configuration, including first and second rear window portions, and a low value of wind drag coefficient.

SUMMARY OF THE INVENTION

In accordance with the invention, there is provided a rear window arrangement for a fastback vehicle which includes a first rear window portion having a first angle with respect to the vertical. The first angle is selected to ensure a smooth laminar flow of air along the surface, and a drag coefficient no greater than that of a square back vehicle. There is also provided a second rear window portion located behind and below the first window portion. The second window portion has a second and smaller angle with respect to the vertical. The two window portions meet at a rearward pointing transverse corner. A spoiler if provided arranged along the corner and having an upper deflection surface at an angle of at least 90° from the vertical.

The spoiler may be provided with a lower surface having a greater angle from the vertical than the upper deflection surface which meets the upper surface at the trailing edge of the spoiler. A third downwardly facing guide surface on the spoiler may be provided facing the transverse window edge at a selected distance from the edge, forming a flow channel for air flow along the first window portion. The guide surface is appropriately 5 cm to 25 mm from the surfaces of the windows. The guide surface may be concave thereby to follow the transition between the first and second window portions. In a preferred embodiment, the two window portions are formed by bending a single window pane.

Where a guide surface is provided on the spoiler, the spoiler produces a downward flow over the lower window portion and thereby ensures a dirt-free area on the second rear window portion.

The use of a single pane of glass to form both window portions ensures a smooth transition between the window portions, free of metallic supports, seals, and the like. Such a bent window can be fabricated by localized heating and bending of a flat pane of glass.

For a better understanding of the present invention, together with other and further embodiments, reference is made to the following description, taken in conjunction with the accompanying drawings, and its scope will be pointed out in the appended claims.

DESCRIPTION OF THE INVENTION

Figure 1:
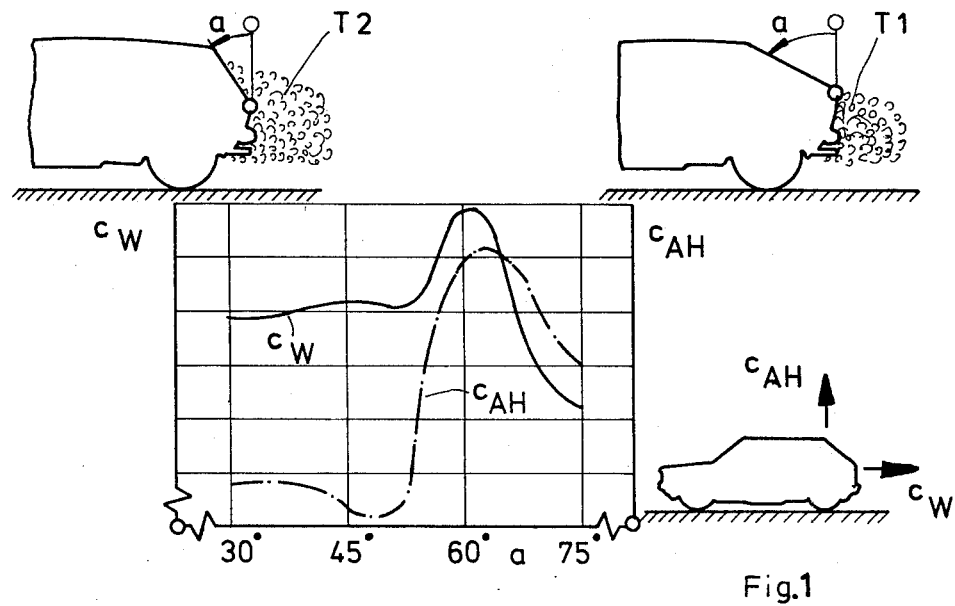
FIG. 1 illustrates the vehicle configuration to which the present invention applies, and includes a graph showing the variation of drag and lift coefficients with rear window angles.
Figure 3:
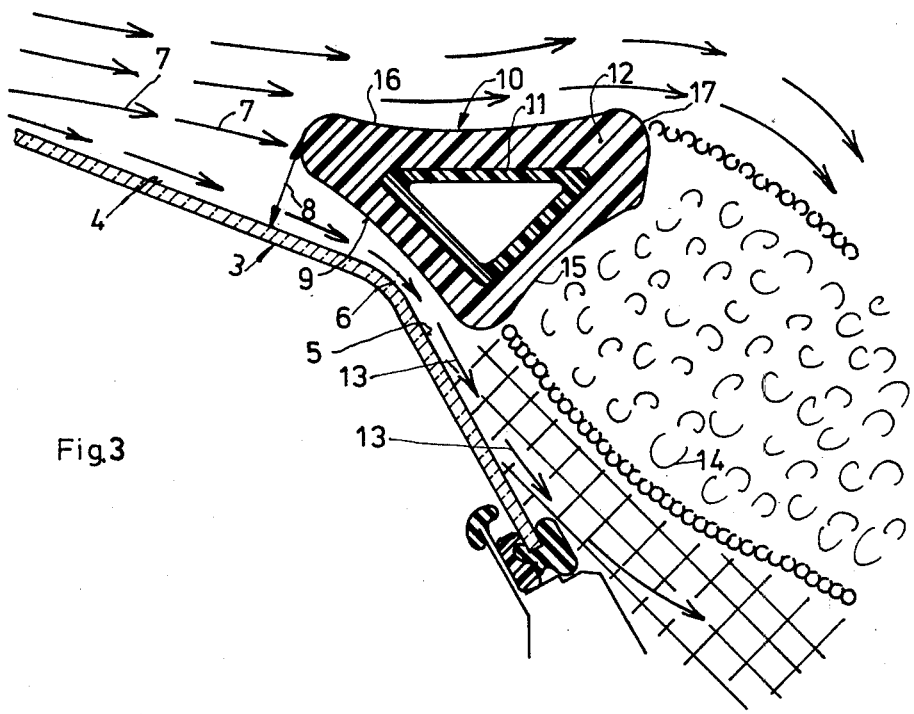
FIG. 3 is a detailed cross-sectional view of the spoiler region of the rear window of the FIG. 2 vehicle.
Figure 2:
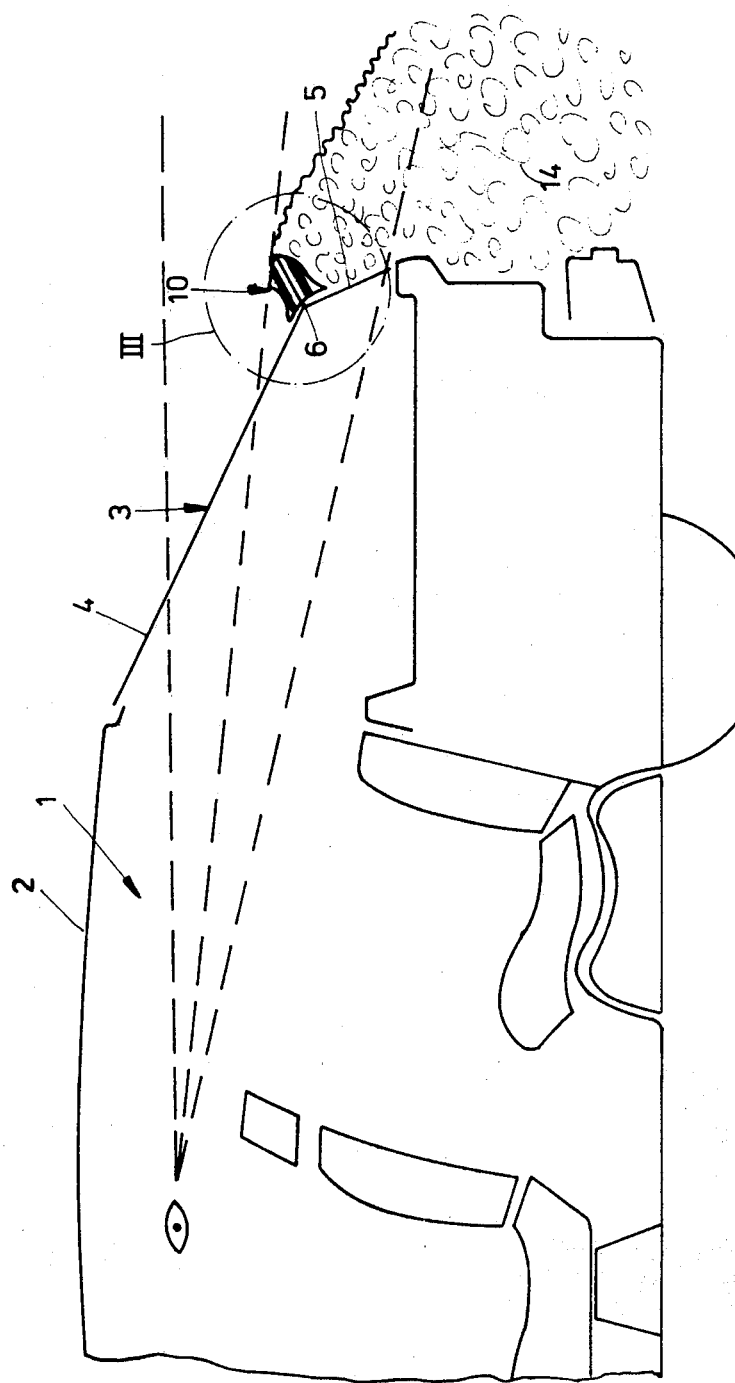
FIG. 2 is a side view of a vehicle in accordance with the present invention.

Referring to FIGS. 2 and 3, there is shown a side view and detailed cross-sectional view illustrating a rear window arrangement for a motor vehicle in accordance with the invention. The vehicle 1 has a flat roof poriton 2 and a bent rear window 3. The rear window 3 is bent to provide a first rear window portion 4 and a second rear window portion 5, which meet to form an corner 6. Since the vehicle is designed to operate as a fastback, an adjacent laminar air flow predominates along the surface of the first rear window portion 3. This flow is indicated by arrows 7 in FIG. 3. A rear spoiler 10 is provided adjacent to and spaced a selected distance 8 away from the rear window in the vicinity of the corner at which the two window portions meet. The distance 8 is selected according to the type of vehicle involved and is generally 5 to 25 mm.

The rear spoiler 10 includes a guide surface 9 which deflects a portion of the air flowing along the first rear window portion in the direction of the second rear window portion as indicated by arrows 13. This downward flow of air prevents the customary dirtying of the second rear window portion because of the dead air space 14. Spoiler 10 includes a hollow supporting core 11 and an outer covering 12 of resilient, ruber-like material. In order to ensure the downward flow of air to the second rear window portion, the spoiler 10 extends from the edge 6 several centimeters over the first rear window portion 4.

The spoiler 10 is also provided with a concave upper deflection surface 16 which has a greater angle from the vertical than the first rear window portion, and is generally horizontal, or inclined upwardly. Thus, the deflection surface 16 has an angle at least 90° from the vertical. The lower surface 15 of the spoiler 10 meets the upper deflection surface 16 at the trailing edge 17 so that the entire spoiler has a generally triangular cross-sectional configuration. Surface 15 is generally at a greater angle from the vertical than first rear window portion 4 or the upper deflection surface 16.

In order to simplify fabrication of the two portion rear windows and also to create a smooth flow channel from the first rear window portion through the guide channel to the second rear window portion, both portions 4 and 5 are parts of a single rear window 3 which is bent at corner 6.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

We claim:

1. A rear window arrangement for a fastback vehicle comprising a first rear window portion having a first angle with respect to the vertical, said first angle being selected to ensure a smooth laminar flow of air along the first window portion and a drag coefficient no greater than that of a square back vehicle, and a second rear window portion, behind and below the first window portion and having a second and smaller angle with respect to the vertical, said first and second window portions meeting at a rearward pointing outside corner, and a rear spoiler along said corner, said spoiler having an upper deflection surface having an angle of at least 90° from the vertical.

2. A rear window arrangement as specified in claim 1 wherein said spoiler has a lower surface having a greater angle from the vertical than said upper deflection surface and meeting said upper surface at the trailing edge of said spoiler.

3. A rear window arrangement as specified in claim 1 wherein said spoiler has a downwardly facing guide surface facing said transverse window corner and having a selected distance from said corner thereby forming a flow channel for air flowing along said first window portion.

4. A rear window arrangement as specified in claim 3 wherein said selected distance is 5 to 25 mm.

5. A rear window arrangement as specified in claim 3 wherein said guide surface is concave to follow the transition between said first and second window portions.

6. A rear window arrangement as specified in any of claims 1, 2, 3, 4, or 5 wherein said first and second window portions are formed from a single bent window pane.

* * * * *